(12) United States Patent
Shwartz et al.

(10) Patent No.: US 11,307,915 B1
(45) Date of Patent: Apr. 19, 2022

(54) GROUPING ANOMALOUS COMPONENTS OF A DISTRIBUTED APPLICATION

(71) Applicant: International Business Machines Corporation, Armonk, NY (US)

(72) Inventors: Larisa Shwartz, Greenwich, CT (US); Jinho Hwang, Dobbs Ferry, NY (US); Pooja Aggarwal, Bangalore (IN); Seema Nagar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/244,024

(22) Filed: Apr. 29, 2021

(51) Int. Cl.
G06F 11/07 (2006.01)
H04L 41/0659 (2022.01)

(52) U.S. Cl.
CPC ........ G06F 11/0709 (2013.01); G06F 11/079 (2013.01); G06F 11/0715 (2013.01); G06F 11/0745 (2013.01); H04L 41/0659 (2013.01)

(58) Field of Classification Search
CPC ............... G06F 11/079; G06F 11/0709; G06F 11/0715; G06F 16/9024; G06F 11/0745; H04L 41/0659; H04L 41/0677; H04L 41/0681; H04L 41/069
See application file for complete search history.

(56) References Cited

U.S. PATENT DOCUMENTS

| | | | |
|---|---|---|---|
| 7,502,972 B1 | 3/2009 | Chilukuri et al. | |
| 9,552,242 B1 | 1/2017 | Leshinsky et al. | |
| 9,684,524 B1 * | 6/2017 | Porter | H04L 41/08 |
| 9,767,302 B2 | 9/2017 | Lim | |
| 10,198,250 B1 * | 2/2019 | Sharma | G06F 8/75 |
| 10,621,735 B2 | 4/2020 | Saleemi et al. | |
| 10,681,056 B1 | 6/2020 | Badawy et al. | |
| 10,862,928 B1 | 12/2020 | Badawy et al. | |

(Continued)

FOREIGN PATENT DOCUMENTS

WO  WO-2021106014 A1 * 6/2021

OTHER PUBLICATIONS

B. Xin, P. Eugster, X. Zhang and J. Yang, "Lightweight Task Graph Inference for Distributed Applications," 2010 29th IEEE Symposium on Reliable Distributed Systems, 2010, pp. 100-110 (Year: 2010).*

(Continued)

*Primary Examiner* — Matthew M Kim
*Assistant Examiner* — Indranil Chowdhury
(74) *Attorney, Agent, or Firm* — Amin, Turocy & Watson, LLP

(57) ABSTRACT

Systems, devices, computer-implemented methods, and/or computer program products that facilitate fault localization for distributed applications. In one example, a system can comprise a process that executes computer executable components stored in memory. The computer executable components can comprise a graph compiler and a partitioning component. The graph compiler can generate a hypernode graph for a distributed application using causality data inferred from log data generated by services emitting errors. The distributed application can comprise the services. The partitioning component can cluster the services into a plurality of groups using the hypernode graph and an objective function.

25 Claims, 9 Drawing Sheets

(56) References Cited

U.S. PATENT DOCUMENTS

| | | | | |
|---|---|---|---|---|
| 2011/0234594 | A1* | 9/2011 | Charles | G06Q 30/02 |
| | | | | 345/440 |
| 2015/0355957 | A1 | 12/2015 | Steiner et al. | |
| 2019/0340059 | A1* | 11/2019 | Bagarolo | G06F 8/71 |
| 2020/0287923 | A1* | 9/2020 | Raghavendra | G06N 3/088 |
| 2021/0097081 | A1* | 4/2021 | Firnkes | G06F 16/27 |
| 2021/0133014 | A1* | 5/2021 | Agarwal | G06F 11/0709 |
| 2021/0133076 | A1* | 5/2021 | Su | H04L 67/36 |
| 2021/0303632 | A1* | 9/2021 | Parthasarathy | G06F 16/9035 |

OTHER PUBLICATIONS

Anonymous, "An artificial intelligence system recommending cloud services by recognizing mind map," An IP.com Prior Art Database Technical Disclosure, IPCOM000254757D, Jul. 28, 2018, 4 pages.

Anonymous, "System and Method for Autonomous Cognitive Service Optimization and Customization Based on Tunable Business Objectives," An IP.com Prior Art Database Technical Disclosure, IPCOM000256129D, Nov. 6, 2018, 6 pages.

Anonymous, "Smart Command Line Contextualization Mechanism," An IP.com Prior Art Database Technical Disclosure, IPCOM000261052D, Jan. 22, 2020, 5 pages.

Azizifard et al., "Modularity Optimization for Clustering in Social Networks," International Conference on Emerging Trends in Computerand Image Processing (ICETCIP'2011) Bangkok Dec. 2011, 4 pages.

Kaminski et al., "Clustering via Hypergraph Modularity," arXiv:1810. 04816v1 [math.CO] Oct. 11, 2018, 22 pages.

Pizzuti, "Community detection in social networks with genetic algorithms," GECCO '08: Proceedings of the 10th annual conference on Genetic and evolutionary computation, Jul. 2008, 3 pages.

Landauer et al., "System Log Clustering Approaches for Cyber Security Applications: A Survey," Computers & Security, 92:101739, May 2010, 18 pages.

Fu et al., "Execution Anomaly Detection in Distributed Systems through Unstructured Log Analysis," ICDM 2009, The Ninth IEEE International Conference on Data Mining, Miami, Florida, USA, Dec. 6-9, 2009, 11 pages.

Zhou et al., "Latent error prediction and fault localization for microservice applications by learning from system trace logs," Proceedings of the 2019 27th ACM Joint Meeting on European Software Engineering Conference and Symposium on the Foundations of Software Engineering, 2019, 14 pages.

"IBM Cloud Pak for Watson AIOps," https://www.ibm.com/cloud/cloud-pak-for-watson-aiops, 12 pages.

Mell et al., "The NIST Definition of Cloud Computing," Recommendations of the National Institute of Standards and Technology, NIST Special Publication 800-145, Sep. 2011, 7 pages.

\* cited by examiner

GROUPING ANOMALOUS COMPONENTS OF A DISTRIBUTED APPLICATION

BACKGROUND

One or more embodiments herein relate to computing devices, and more specifically, to systems, devices, computer-implemented methods, and/or computer program products that facilitate fault localization for distributed applications.

Microservice architectures are increasingly gaining popularity when designing software applications as they enable developers to operate on independent schedules and deliver with high speed, thereby shortening time-to-market. With respect to applications deployed in hybrid cloud environments, microservice architectures are particularly appealing because the loosely coupled components of applications (e.g., distributed applications) implemented using a microservice architecture offer improved scalability, flexibility, maintainability, and accelerated developer productivity. As a result, developers have been switching from traditional monolithic architectures to microservice architectures.

Maintaining the health status of applications implemented using a microservice architecture has become a challenge for the information technology (IT) professionals, such as DevOps and site reliability engineers (SREs). For example, faults within a distributed application can correspond with multiple services of the application becoming anomalous or otherwise failing. As another example, a fault within one service of a distributed application can spread across one or more other services of the application. As another example, multiple services of a distributed application can simultaneously emit errors. Therefore, grouping erroneous services of a distributed application to segregate such services emitting errors into multiple buckets can be an important task to facilitate fault localization or error detection for distributed applications.

Log data can generally be utilized to facilitate fault localization or error detection for distributed applications since instrumentation and tracing using metrics data can come with extra overhead costs. Techniques that utilize log data to group erroneous services of a distributed application generally utilize the textual portion of log lines comprising the log data to segregate such services into multiple buckets. Such techniques can fail to account for causality among services or error log templates. Moreover, such techniques can fail to consider tokens that can flow across services of a distributed application.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate fault localization for distributed applications are described.

According to an embodiment, a system can comprise a process that executes computer executable components stored in memory. The computer executable components can comprise a graph compiler and a partitioning component. The graph compiler can generate a hypernode graph for a distributed application using causality data inferred from log data generated by services emitting errors. The distributed application can comprise the services. The partitioning component can cluster the services into a plurality of groups using the hypernode graph and an objective function. One aspect of such a system is that the system can facilitate fault localization for distributed applications.

In an embodiment, the computer executable components can further comprise a token component that generates token vectors for the services using tokens flowing across the services that are observed in the log data. One aspect of such a system is that the system can facilitate capturing services within a given grouping among the plurality of groupings that exhibit substantially similar behavior with respect to such tokens while any pair of groupings among the plurality of groupings can exhibit substantially different behavior with respect to such tokens.

According to another embodiment, a computer-implemented method can comprise generating, by a system operatively coupled to a processor, a hypernode graph for a distributed application using causality data inferred from log data generated by services emitting errors. The distributed application can comprise the services. The computer-implemented method can further comprise clustering, by the system, the services into a plurality of groups using the hypernode graph and an objective function. One aspect of such a computer-implemented method is that the method can facilitate fault localization for distributed applications.

In an embodiment, the objective function can include a modularity metric that evaluates intergroup cohesion and intragroup cohesion within the plurality of groups. In an embodiment, the system can cluster the services into the plurality of groups by maximizing the modularity metric using the hypernode graph. One aspect of such a computer-implemented method is that the method can facilitate evaluating intergroup cohesion and intragroup cohesion within the plurality of groupings comprising the community structure.

According to another embodiment, a computer program product for hardware-efficient calibration of quantum computing devices can comprise a computer readable storage medium having program instructions embodied therewith. The program instructions are executable by a processor to cause the processor to perform operations. The operations can include generating, by the processor, a hypernode graph for a distributed application using causality data inferred from log data generated by services emitting errors. The distributed application can comprise the services. The operations can further include clustering, by the processor, the services into a plurality of groups using the hypernode graph and an objective function. One aspect of such a computer program product is that the computer program product can facilitate fault localization for distributed applications.

In an embodiment, the objective function can include a text-based metric that evaluates the log data for intergroup textual similarity and intragroup textual similarity within the plurality of groups. One aspect of such a computer program product is that the computer program product can facilitate evaluating intergroup log line similarity and intragroup log line similarity.

According to another embodiment, a system can comprise a process that executes computer executable components stored in memory. The computer executable components can comprise a graph compiler, a token component, and a partitioning component. The graph compiler can generate a hypernode graph for a distributed application using causality data inferred from log data generated by services emitting errors. The distributed application can comprise the services. The token component can generate token vectors for the services using tokens flowing across the services that are observed in the log data. The partitioning component can cluster the services into a plurality of groups using the hypernode graph, the token vectors, and an objective function. One aspect of such a system is that the system can facilitate fault localization for distributed applications.

In an embodiment, the graph compiler can generate the hypernode graph using a template-level causal graph constructed using template-level timeseries data obtained from the log data and a service-level causal graph constructed using service-level timeseries data obtained from the log data. One aspect of such a system is that the system can facilitate accounting for causality among services or error log templates.

According to another embodiment, a computer-implemented method can comprise generating, by a system operatively coupled to a processor, a hypernode graph for a distributed application using causality data inferred from log data generated by services emitting errors. The distributed application can comprise the services. The computer-implemented method can further comprise generating, by the system, token vectors for the services using tokens flowing across the services that are observed in the log data. The computer-implemented method can further comprise clustering, by the system, the services into a plurality of groups using the hypernode graph, the token vectors, and an objective function. One aspect of such a computer-implemented method is that the method can facilitate fault localization for distributed applications.

In an embodiment, the system can generate the hypernode graph using a template-level causal graph constructed using template-level timeseries data obtained from the log data and a service-level causal graph constructed using service-level timeseries data obtained from the log data. One aspect of such a computer-implemented method is that the method can facilitate accounting for causality among services or error log templates.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
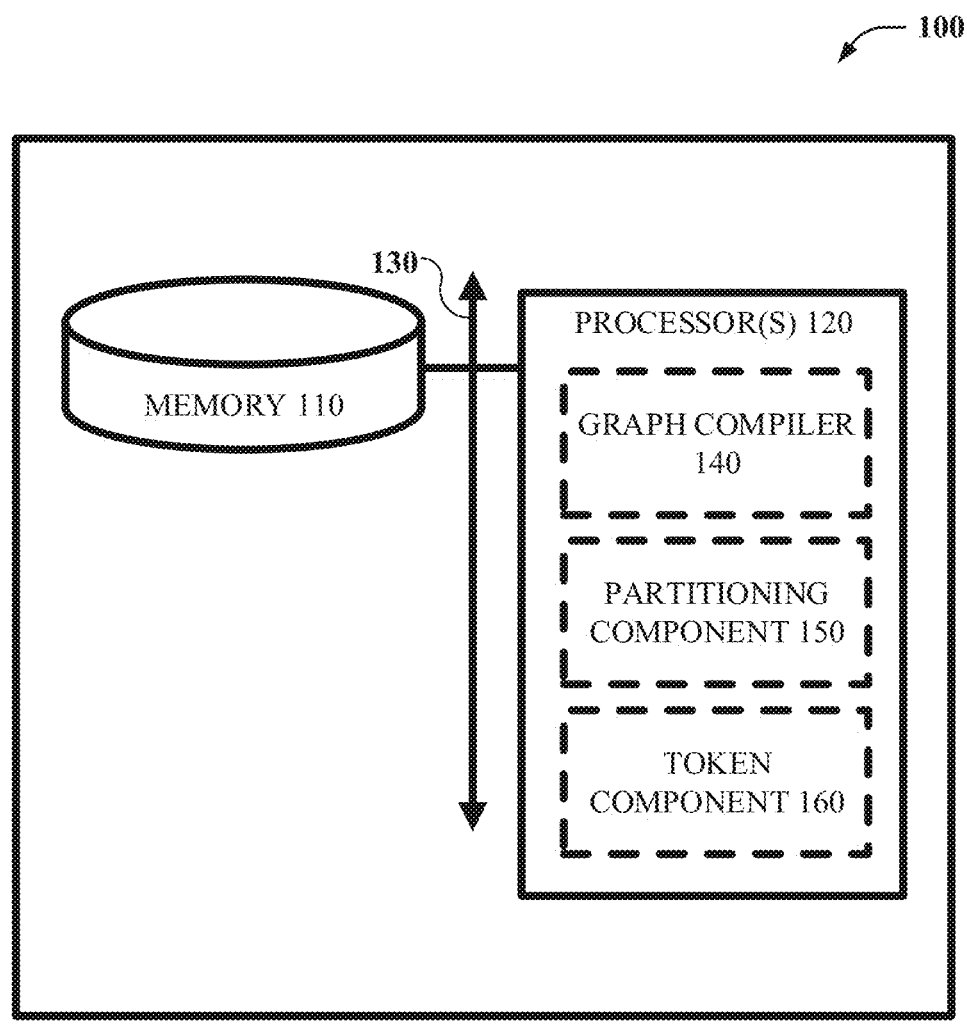
FIG. 1 illustrates a block diagram of an example, non-limiting system that can facilitate fault localization for distributed applications, in accordance with one or more embodiments described herein.

FIG. 1 illustrates a block diagram of an example, non-limiting system 100 that can facilitate fault localization for distributed applications, in accordance with one or more embodiments described herein. System 100 includes memory 110 for storing computer-executable components and one or more classical processors 120 operably coupled via one or more communication busses 130 to memory 110 for executing the computer-executable components stored in memory 110. As shown in FIG. 1, the computer-executable components can include a graph compiler 140 and a partitioning component 150.

Graph compiler 140 can generate a hypernode graph for a distributed application using causality data inferred from log data generated by services emitting errors, as described in greater detail below with respect to FIG. 4. The distributed application can comprise the services. In an embodiment, the hypernode graph can include a hypernode that corresponds to a particular service of the distributed application, a node inside the hypernode that corresponds to a given error template observed for the particular service, an edge coupling a respective pair of nodes that are causally related, a hyperedge coupling a respective pair of hypernodes that are causally related, or a combination thereof. In an embodiment, graph compiler 140 can generate the hypernode graph using a template-level causal graph constructed using template-level timeseries data obtained from the log data, as described in greater detail with reference to FIG. 5. In an embodiment, graph compiler 140 can generate the hypernode graph using a service-level causal graph constructed using service-level timeseries data obtained from the log data, as described in greater detail with reference to FIG. 5.

Partitioning component 150 can cluster the services into a plurality of groups using the hypernode graph and an objective function, as described in greater detail with reference to FIG. 4. In an embodiment, the objective function can include a modularity metric that evaluates intergroup cohesion and intragroup cohesion of the plurality of groups. In an embodiment, partitioning component 150 can cluster the services into the plurality of groups by maximizing the modularity metric using the hypernode graph. In an embodiment, the objective function can include a textual similarity metric that evaluates intergroup log line similarity and intragroup log line similarity. In an embodiment, the objective function can include a cross-entropy metric that evaluates intergroup entropy relative to intragroup entropy.

In an embodiment, the computer-executable components stored in memory 110 further can include token component 160. Token component 160 can generate token vectors for the services using tokens flowing across the services that are observed in the log data, as described in greater detail with reference to FIG. 4. In an embodiment, the objective function can include a cross-entropy metric that evaluates intergroup cross-entropy relative to intragroup cross-entropy of the plurality of groups. In an embodiment, partitioning component 150 can cluster the services into the plurality of groups by evaluating the cross-entropy metric using the token vectors. The functionality of the computer-executable components utilized by the embodiments will be covered in greater detail below.

A software application (application) can be implemented with a monolithic architecture using a single codebase comprising multiple tightly coupled components or modules that can build to one executable program by executing in a single process or run-time environment. Components of the application implemented with the monolithic architecture can each provide different functionalities to serve an external request or perform a specific task. Such components can be built using classes or packages and can communicate with other components using method calls. A software application can also be implemented with a microservice architecture in which the software application can be composed of a loosely coupled set of well-defined stateless services (or microservices).

Figure 2:
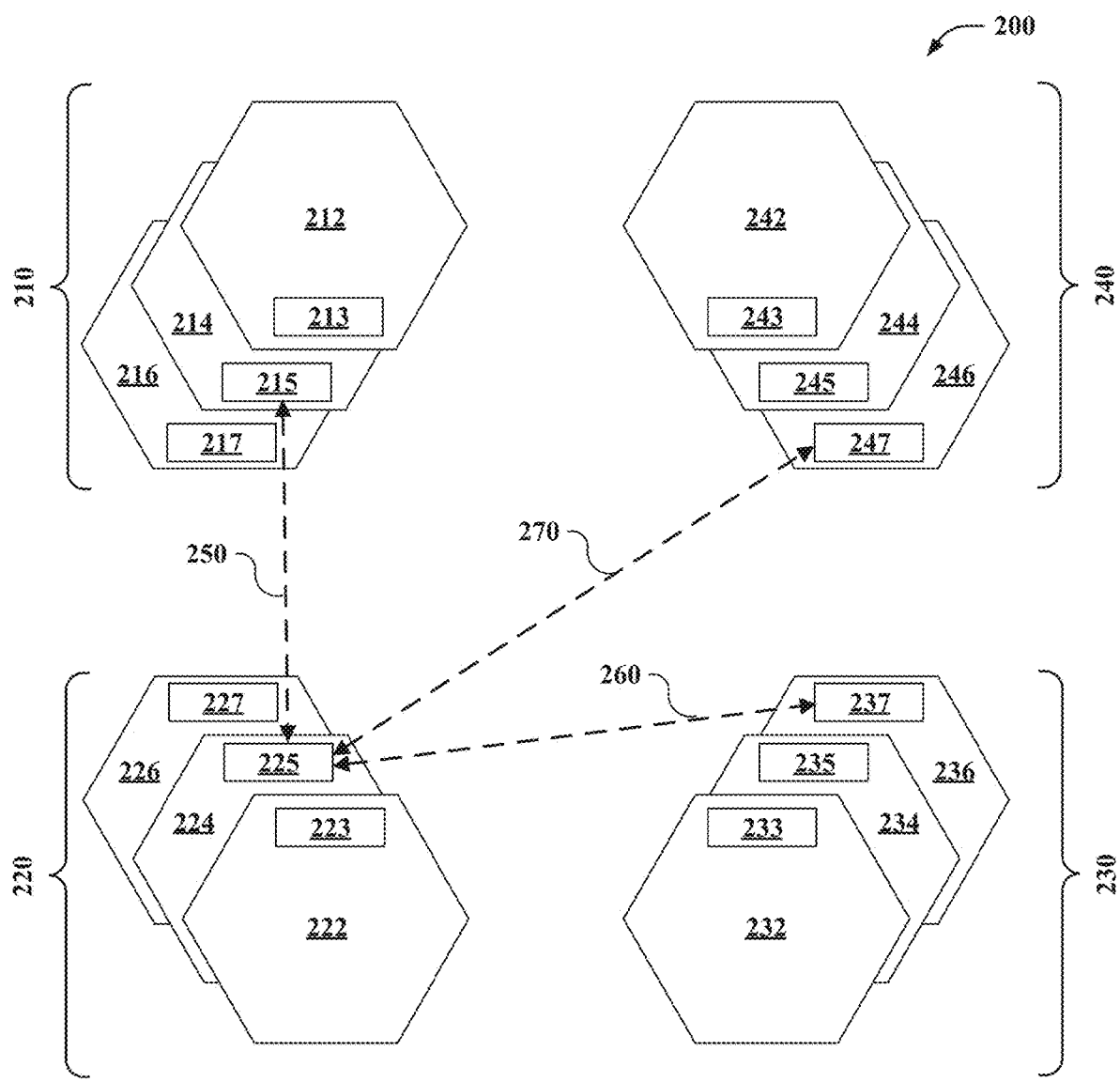
FIG. 2 illustrates an example, non-limiting microservice architecture, in accordance with one or more embodiments described herein.

FIG. 2 illustrates an example, non-limiting microservice architecture 200, in accordance with one or more embodiments described herein. Microservice architecture 200 can comprise a loosely coupled set of well-defined stateless services that can implement an application (e.g., a distributed application). As shown by FIG. 2, microservice architecture 200 can include services 210, 220, 230, and/or 240. Each service comprising microservice architecture 200 can provide a different functionality to implement an application that can serve external requests or perform specific tasks. For example, services 210, 220, 230, and/or 240 of microservice architecture 200 can implement an e-commerce application. In this example, service 210 can be a frontend service that can provide an end user with an entry point to the e-commerce application; service 220 can be a product catalog service that can provide product availability information; service 230 can be a checkout service that can facilitate placing product orders; and service 240 can be an advertisement service that can provide product recommendations.

In contrast to components of an application implemented with a monolithic architecture, each service comprising microservice architecture 200 can execute in a different process or run-time environment. As such, each service comprising microservice architecture 200 can be deployed and/or scaled independently. Continuing with the example above in which microservice architecture 200 can implement an e-commerce application, microservice architecture 200 can comprise three instances of each service at a first time. Of note, the number of instances was selected arbitrarily and only applies to this specific example. In other embodiments, microservice architecture 200 can comprise less instances (e.g., two instances) or more instances (e.g., four instances) of each service at the first time. In this example, microservice architecture 200 can comprise: three instances (e.g., instances 212, 214, and/or 216) of the frontend service (e.g., service 210); three instances (e.g., instances 222, 224, and/or 226) of the product catalog service (e.g., service 220); three instances (e.g., instances 232, 234, and/or 236) of the checkout service (e.g., service 230); three instances (e.g., instances 242, 244, and/or 246) of the payment service (e.g., service 240). At a second time, demand for the functionality provided by the product catalog service (e.g., service 220) of microservice architecture 200 can remain substantially constant while a demand for the functionality provided by the checkout service (e.g., service 230) can decrease. Based on that demand, the checkout service can be rescaled independent from the product catalog service such that microservice architecture 200 includes three instances (e.g., instances 212, 214, and/or 216) of the product catalog service and one instance (e.g., instance 232) of the checkout service.

As discussed above, components of an application implemented with a monolithic architecture can communicate with other components using method calls. In contrast to such components, each service comprising microservice architecture 200 can communicate with other services via a well-defined application programming interface (API). As shown by FIG. 2, each instance of a given service comprising microservice architecture 200 can include a well-defined application programming interface (API). Instances 212, 214, and 216 of service 210 can include APIs 213, 215, and 217, respectively. Instances 222, 224, and 226 of service 220 can include APIs 223, 225, and 227, respectively. Instances 232, 234, and 236 of service 230 can include APIs 233, 235, and 237, respectively. Instances 242, 244, and 246 of service 240 can include APIs 243, 245, and 247, respectively.

Communicating via well-defined APIs can facilitate autonomous operation of each service of microservice architecture 200 to the extent that a given service can communicate a request to invoke a functionality provided by another service without knowledge as to how that service effectuates the functionality. For example, FIG. 2 shows instance 214 of service 210 communicating a request 250 to API 225 of instance 224 to invoke a functionality provided by service 220. Some functionalities provided by services of an application implemented using microservice architecture 200 can depend on functionalities provided by other services of the application. For example, the functionality corresponding to request 250 can depend on functionalities provided by services 230 and 240 of microservice architecture 200. As such, responsive to request 250, instance 224 of service 220 can communicate a request 260 to API 237 of instance 236 to invoke a functionality provided by service 230 and a request 270 to API 247 of instance 246 to invoke a functionality provided by service 240.

Figure 3:
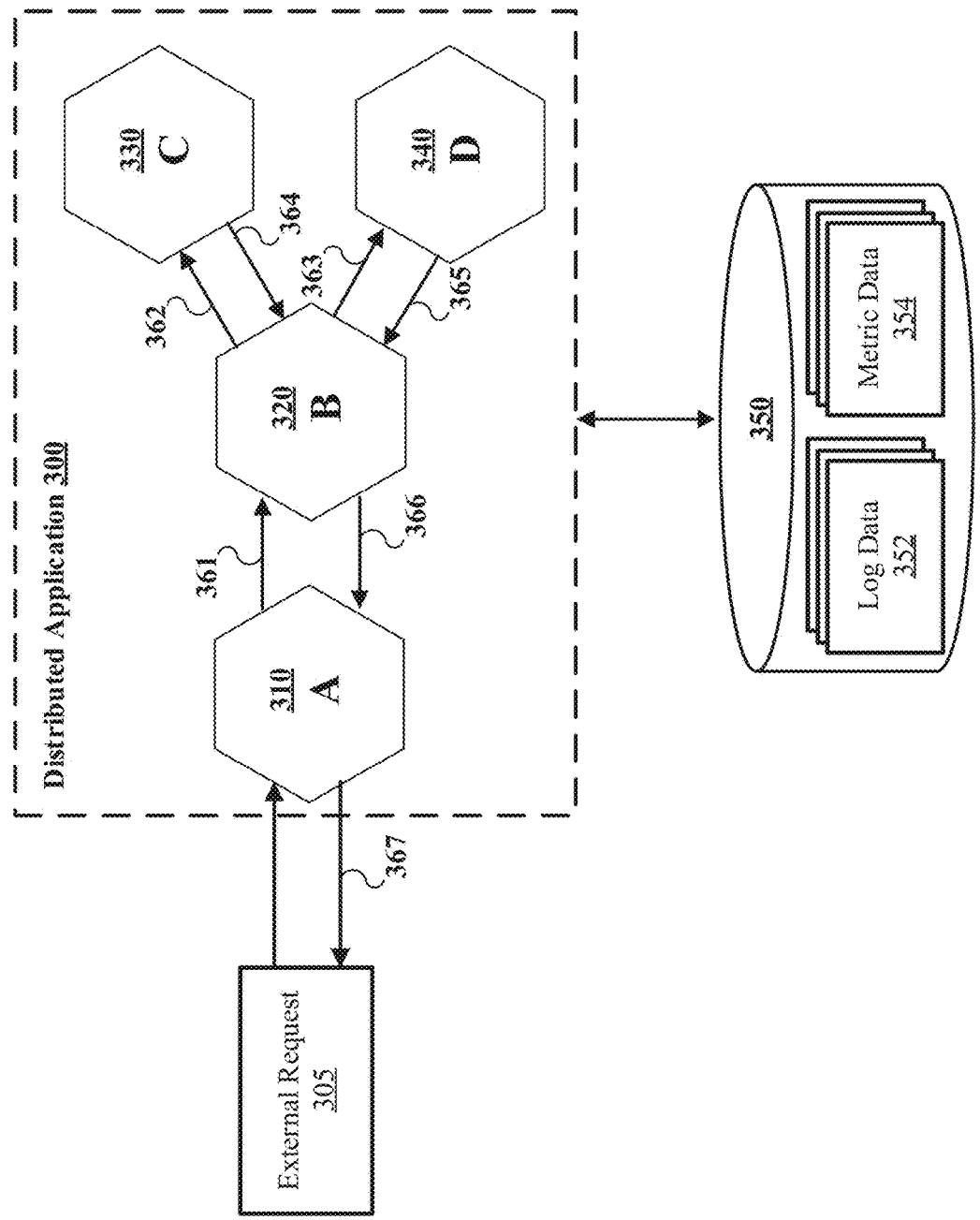
FIG. 3 illustrates an example, non-limiting distributed application, in accordance with one or more embodiments described herein.

FIG. 3 illustrates an example, non-limiting distributed application 300, in accordance with one or more embodiments described herein. Distributed application 300 can be implemented using a microservice architecture (e.g., microservice architecture 200 of FIG. 2). As discussed above with respect to FIG. 2, some functionalities provided by services of an application implemented using a microservice architecture can depend on functionalities provided by other services of the application. Therefore, serving a response 367 to an external request 305 can involve invoking functionalities provided by multiple services of distributed application 300. By way of example, service A 310 of distributed application 300 can receive an external request 305 submitted to distributed application 300. For example, the external request 305 can be submitted to distributed application 300 by a cloud consumer (e.g., computing device 954A of FIG. 9). Responsive to receiving request 305, service A 310 can communicate a request 361 to invoke a functionality provided by service B 320 of distributed application 300.

The functionality provided by service B 320 can depend on functionalities provided by service C 330 and service D 340 of distributed application 300. As such, responsive to receiving request 361, service B 320 can communicate a request 362 to invoke a functionality provided by service C 330 and a request 363 to invoke a functionality provided by service D 340. Service B 320 can receive a response 364 from service C 330 comprising an output of the functionality provided by service C 330 responsive to request 362. Service B 320 can also receive a response 365 from service D 340 comprising an output of the functionality provided by service D 340 responsive to request 363. Service B 320 can communicate a response 366 to service A 310 that can comprise an output of the functionality provided by service B 320 based on the respective outputs included in responses 364 and 365. Service A 310 can communicate a response 367 to external request 305 that comprises an output of the functionality provided by service A 310 based on the output included in response 366.

Distributed application 300 can be communicatively coupled to a database 350 comprising log data 352 and metric data 354. Log data 352 can comprise raw textual information associated with run-time behavior of distributed application 300 that can be generated by one or more services of distributed application 300. Such raw textual information can comprise log lines generated by print statements included in code of such services. Each log line generally represents a record of an event that occurred during run-time. Such events can include, but are not limited to, a particular service: receiving a communication, transmitting a communication, encountering an error while processing a request, executing a particular functionality, and other events occurring during run-time of distributed application 300. In an embodiment, log data 352 can further comprise tokens (e.g., request identifier tokens, transaction identifier tokens, and other tokens) that can flow across the various services of distributed application 300 while serving external requests, executing transactions, and/or performing specific tasks. Metric data 354 can comprise information corresponding to various metrics that can measure performance of distributed application 300 and/or one or more services comprising distributed application 300 (e.g., central processing unit (CPU) usage, memory consumption, average response time, remote procedure call (RPC) latency, and the like).

In an embodiment, a request identifier token can be generated by a service (e.g., service A 310) associated with distributed application 300 that uniquely identifies external request 305. In an embodiment, requests 361, 362, and/or 363 can comprise the request identifier token. In an embodiment, responses 364, 365, and/or 366 can comprise the request identifier token. In an embodiment, reception of a request (e.g., requests 361, 362, and/or 363) by a service (e.g., service A 310, service B 320, service C 330, and/or service D 340) can trigger the service to modify log data 352 with raw textual information indicative of the request. In an embodiment, the raw textual information can comprise the request identifier token. In an embodiment, reception of a response (e.g., responses 364, 365, and/or 366) by a service (e.g., service A 310, service B 320, service C 330, and/or service D 340) can trigger the service to modify log data 352 with raw textual information indicative of the response. In an embodiment, the raw textual information can comprise the request identifier token.

Localizing faults or anomalous behavior within applications implemented using a microservice architecture (e.g., distributed application 300) can be challenging for a number of reasons. For example, a fault in one or more services comprising an application implemented using a microservice architecture can cause non-faulty services to emit errors to the extent that some functionalities provided by services of such applications can depend on functionalities provided by other services. In this example, while the non-faulty services can be executing properly, the non-faulty services can appear faulty by virtue of emitting errors based on erroneous outputs generated by one or more faulty services.

By way of example, the output of the functionality provided by service A 310 included in response 367 can be erroneous even though service A 310 is functioning properly. In this example, service C 330 can be faulty while each remaining service (e.g., service A 310, service B 320, and/or service D 340) can be functioning properly. As such, the output of the functionality provided by service C 330 that service B 320 received in response 364 can be erroneous. To the extent that the output of the functionality provided by service B 320 is based, in part, on that erroneous output of the functionality provided by service C 330, service B 320 can communicate erroneous output to service A 310 in response 366 even though service B 320 is functioning properly.

While FIG. 3 depicts distributed application 300 as comprising four services other applications implemented using a microservice architecture can include more services. Increasing a number of services comprising such applications can further perplex the task of localizing faults or anomalous behavior. That task can be further complicated when multiple iterations of services are introduced.

Figure 4:
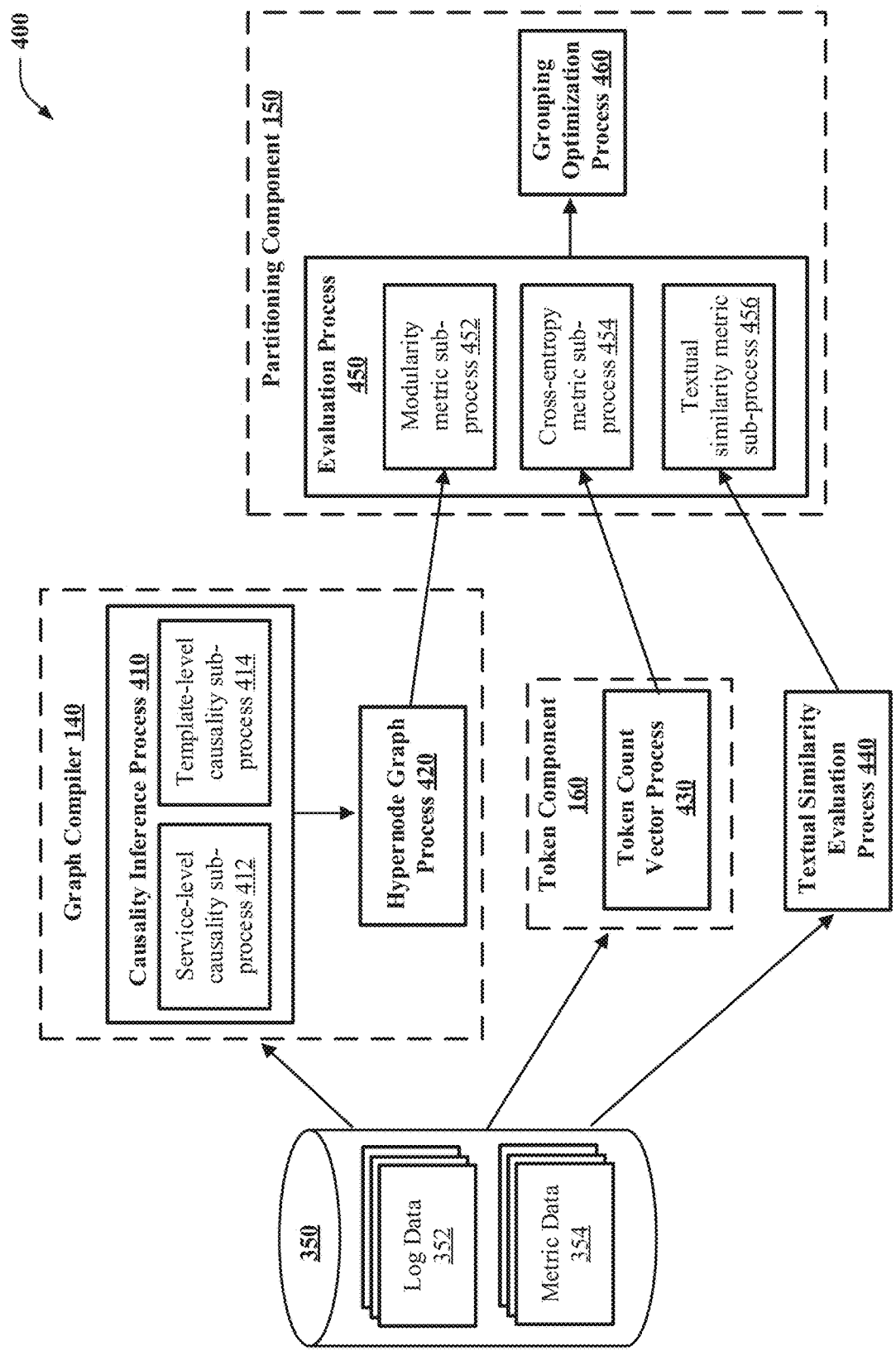
FIG. 4 illustrates an example, non-limiting framework that can facilitate fault localization for distributed applications, in accordance with one or more embodiments described herein.

FIG. 4 illustrates an example, non-limiting framework 400 that can facilitate fault localization for distributed applications, in accordance with one or more embodiments described herein. To that end, framework 400 can leverage log data 352 and/or metric data 354 stored in database 350 to group services emitting errors during runtime of an application (e.g., distributed application 300) implemented using a microservice architecture. As discussed above, graph compiler 140 can generate a hypernode graph for a distributed application using causality data inferred from log data generated by services emitting errors. Graph compiler 140 can include a causality inference process 410 with a service-level causality sub-process 412 and a template-level causality sub-process 414 to infer such causality data at a service-level and a template-level, respectively.

Figure 5:
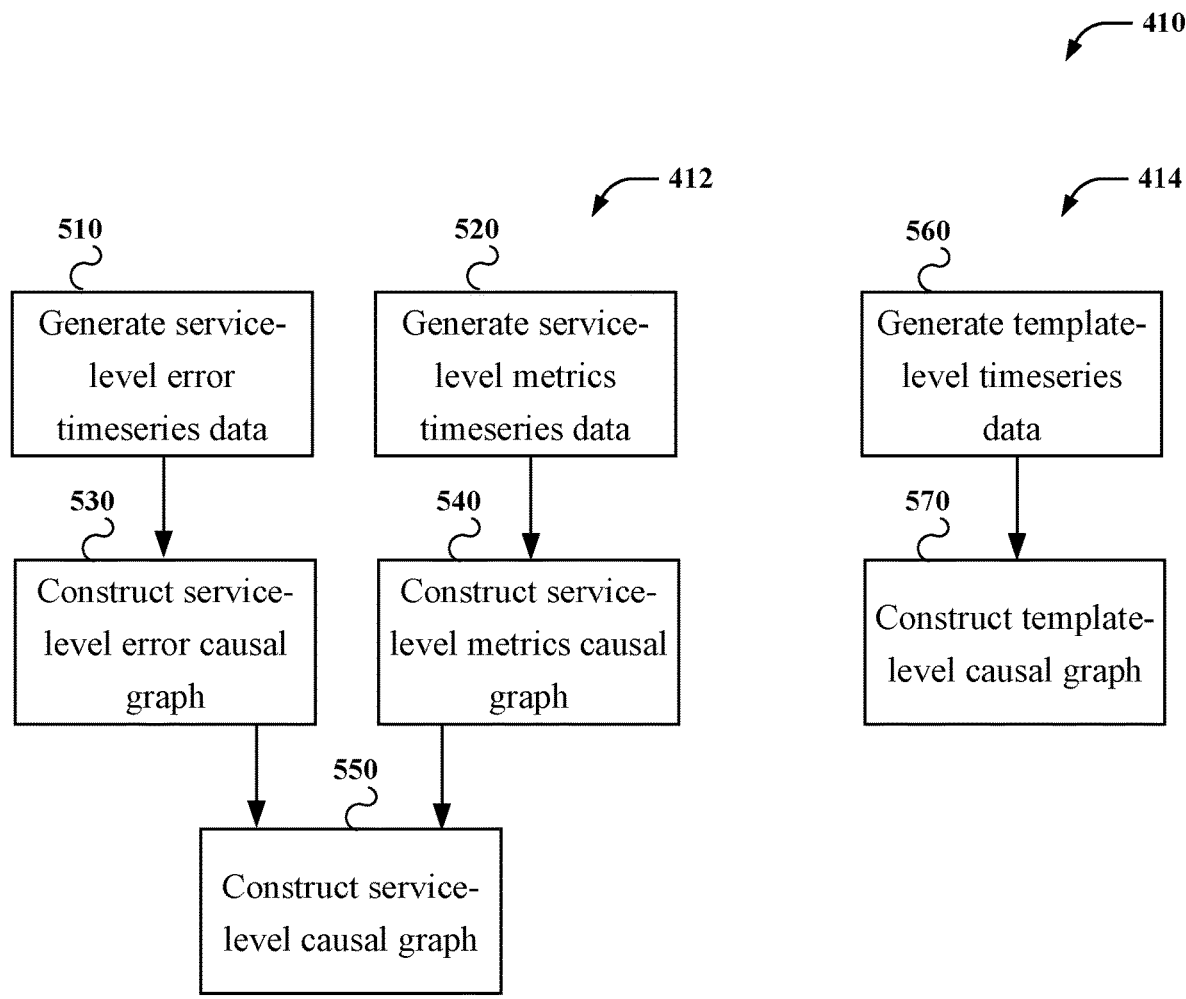
FIG. 5 illustrates an example, non-limiting causality inference process, in accordance with one or more embodiments described herein.

With reference to FIG. 5, service-level causality sub-process 412 can comprise generating service-level error timeseries data for each service emitting errors, at block 510. Generating the service-level error timeseries data for a given service emitting errors can involve identifying log lines of log data 352 that are associated with the given service. Generating the service-level error timeseries data for the given service can further involve counting a number of errors that appear in such log lines within each time bin of a defined length (e.g., 10 seconds, 1 minute, 5 minutes, etc.). In an embodiment, the service-level error timeseries data can comprise a plurality of time bins constructed in a sliding manner. At block 520, service-level causality sub-process 412 can further comprise generating service-level metrics timeseries data for each service emitting errors. Generating the service-level metric timeseries data for a given service emitting errors can involve identifying metrics data 354 that is associated with the given service. Generating the service-level metrics timeseries data for the given service can further involve partitioning the identified metrics data 354 into a plurality of time bins with each time bin having a defined length (e.g., 10 seconds, 1 minute, 5 minutes, etc.).

At block 530, service-level causality sub-process 412 can further comprise constructing a service-level error causal graph from the service-level error timeseries data generated at block 510. Constructing the service-level error causal graph can involve applying a causality inference technique (e.g., Granger causality analysis, Principal Component (PC) analysis, and/or other causality inference techniques) to the service-level error timeseries data generated at block 510 for each service emitting errors. At block 540, service-level causality sub-process 412 can further comprise constructing a service-level metric causal graph from the service-level metrics timeseries data generated at block 520. Constructing the service-level metric causal graph can involve applying a causality inference technique (e.g., Granger causality analysis, Principal Component (PC) analysis, and/or other causality inference techniques) to the service-level metrics timeseries data generated at block 520 for each service emitting errors. At block 550, the service-level error causal graph constructed at block 530 and the service-level metric causal graph constructed at block 540 can be federated to construct a service-level causal graph.

Template-level causality sub-process 414 can comprise generating template-level timeseries data for each error template derived from log data 352 using a log-templatization technique, at block 560. Generating the template-level error timeseries data for a given error template can involve counting a number of times that the given error template appears in log lines of log data 352 within each time bin of a defined length (e.g., 10 seconds, 1 minute, 5 minutes, etc.). In an embodiment, the template-level error timeseries data can comprise a plurality of time bins constructed in a sliding manner. At block 570, template-level causality sub-process 414 can further comprise constructing a template-level causal graph from the template-level timeseries data generated at block 560.

With reference to FIG. 4, graph compiler 140 can further include a hypernode graph process 420 that can generate a hypernode graph for a distributed application using causality data obtained from causality inference process 410. In particular, hypernode graph process 420 can generate the hypernode graph using a service-level causal graph constructed by service-level causality sub-process 412 and a template-level causal graph constructed by template-level causality sub-process 414. The hypernode graph constructed by hypernode graph process 420 can include a hypernode that corresponds to a particular service of the distributed application. A node inside the hypernode of the hypernode graph can correspond to a given error template observed for the particular service. Each edge of the hypernode graph can couple a respective pair of nodes within a given hypernode that are causally related. Each hyperedge of the hypernode graph can couple a respective pair of hypernodes that are causally related.

Framework 400 can further comprise token component 160 that can generate token vectors for the services of the distributed application. Token component 160 can comprise a token count vector process 430 to generate such token vectors. Token count vector process 430 can involve parsing log data 352 to identify tokens flowing across the services. Such tokens can include, but are not limited to, transaction identifier tokens, request identifier tokens, and/or other tokens that can pass from one service of the distributed application to another service. For each service i of the distributed application, token count vector process 430 can create a token vector $T_i$ of size |V|, where V can denote a vocabulary of the tokens. An element of token vector $T_i$ can be a count of a given token identified in log lines of log data 352 that correspond to service i.

By way of example, a distributed application can comprise two services: service $S_1$ and service $S_2$. In this example, token component 160 can observe three tokens in the logs of services $S_1$ and $S_2$ within log data 352: a first token ("abcd1234"); a second token ("gfhijk34kl"); and a third token ("mkn456"). Of note, the number of services, the number of tokens, and the respective token values were selected arbitrarily and only applies to this specific example. Continuing with this example, token count vector process 430 can observe in logs emitted by service $S_1$ that the first token occurred 1 time, the second token occurred 3 times, and the third token did not occur at all or occurred zero times. Based on those observations, a token count vector that token count vector process 430 generates for service $S_1$ can be: <1, 3, 0>. The token count vector for service $S_1$ can be normalized to convert individual token count elements to a value between 0 and 1. The normalized token count vector for service $S_1$ can be <1/4, 3/4, 0/4> or <0.25, 0.75, 0>.

In this example, token count vector process 430 can observe in logs emitted by service $S_2$ that the first token occurred 1 time, the second token did not occur at all or occurred zero times, and the third token occurred 9 times. Based on those observations, a token count vector that token count vector process 430 generates for service $S_2$ can be: <1, 0, 9>. The token count vector for service $S_2$ can be normalized to convert individual token count elements to a value between 0 and 1. The normalized token count vector for service $S_2$ can be <1/10, 0/10, 9/10> or <0.1, 0, 0.9>.

Cross-entropy between services $S_1$ and $S_2$ can be analyzed using the respective normalized token count vectors and a cross-entropy function. In an embodiment, cross-entropy metric sub-process 454 of evaluation process 450 can use the cross-entropy function to analyze a cross-entropy metric of an objective function of evaluation process 450 that is discussed in greater detail below. In an embodiment, the cross-entropy function can be implemented using the cross-entropy function defined by Equation 1:

$$H(p, 1) = -\sum_{x \in X} p(x) \log q(x). \quad \text{Equation 1}$$

In accordance with Equation 1 above: p denotes service $S_1$; q denotes service $S_2$; x denotes a token space (e.g., the three values abcd1234, gfhijk34kl, and mkn456); and p(x) and q(x) denote x token's normalized values for services $S_1$ and $S_2$, respectively.

Framework 400 can further comprise textual similarity evaluation process 440 that can analyze log lines of log data 352 to generate signals indicative of intergroup textual similarity and signals indicative of intragroup textual similarity within groups of services into which partitioning component 150 clusters the services of the distributed application. As discussed above, partitioning component 150 can cluster the services of the distributed application that emit errors into a plurality of groups using the hypernode graph generated by graph compiler 140 and an objective function. To that end, partitioning component 150 can comprise an evaluation process 450 and a grouping optimization process 460. Clustering the services of the distributed application that emit errors into a plurality of groups can involve evaluation process 450 and grouping optimization process 460 interacting to maximize an objective function of evaluation process 450.

Such interactions can comprise a learning process that can include grouping optimization process 460 generating an initial community structure using the hypernode graph that clusters the services of the distributed application into a plurality of groups. In an embodiment, grouping optimization process 460 can generate the initial community structure by randomly assigning the services associated with hypernode graph to groupings of the initial community structure. Given the initial community structure, evaluation process 450 can analyze the objective function for the initial community structure and provide grouping optimization process 460 feedback on the initial community structure. Based on that feedback, grouping optimization process 460 can revise the initial community structure. Given the updated community structure, evaluation process 450 can analyze the objective function for the updated community structure and provide grouping optimization process 460 feedback on the updated community structure. Such interactions that comprise the learning process can occur iteratively until grouping optimization process 460 creates a community structure that maximizes the objective function of evaluation process 450. In an embodiment, the objective function of evaluation process 450 can be implemented using the objective function defined by Equation 2:

$$f(C)=\alpha^*(\text{modularity metric})+\beta^*(\text{cross−entropy metric})+\gamma^*(\text{textual similarity metric}) \quad \text{Equation 2.}$$

In accordance with Equation 2 above, $\alpha$, $\beta$, and/or $\gamma$ can denote weights assigned to algorithm hyperparameters corresponding to the modularity metric, the cross-entropy metric, and the textual similarity metric, respectively. In an embodiment, $\alpha$, $\beta$, and/or $\gamma$ can be adjusted to modify the learning process described above with respect to evaluation process 450 and grouping optimization process 460. In an embodiment, $\alpha$, $\beta$, and/or $\gamma$ can be adjusted using input received from an entity managing an execution environment of the application comprising the services emitting errors.

Modularity metric sub-process 452 can involve analyzing a modularity metric of the objective function of evaluation process 450 using a hypergraph generated by graph compiler 140. In an embodiment, the modularity metric can evaluate intergroup cohesion and intragroup cohesion within the plurality of groupings comprising the community structure. In an embodiment, modularity metric sub-process 452 can comprise a community detection algorithm. The community detection algorithm can include, but not be limited to, a Louvain, Leiden, Fast-greedy, Label Propagation, Stochastic Block Modeling, or other graph-based community detection algorithms. In an embodiment, analyzing the modularity metric can facilitate maximizing intragroup edges of a community structure while minimizing intergroup edges of a community structure. In an embodiment, analyzing the modularity metric can facilitate assigning services that are strongly correlated into one group (or community) of a community structure.

In an embodiment and given a community structure $C=\{C_1, C_2, \ldots, \text{and } C_n\}$, the modularity metric of modularity metric sub-process 452 can be implemented using the modularity metric defined by Equation 3:

$$Q = \frac{1}{2m}\sum_{i,j}\left[A_{ij} - \frac{k_i k_j}{2m}\right]\delta(c_i, c_j). \quad \text{Equation 3}$$

In accordance with Equation 3 above, $A_{ij}$ can denote a weight of an edge between service i and service j within an adjacency matrix A derived from the hypernode graph at a service-level; $k_i$ can denote a sum of weights of the vertex attached to the vertex i (can be referred to as degree of the node); $c_i$ can denote the grouping (or community) to which vertex i is assigned; $\delta(x, y)$ can denote a function that can be 1 if x=y and that can be 0 otherwise; m can denote a number of links that can be defined using ($\frac{1}{2}$) $\Sigma ij\ A_{ij}$.

In an embodiment, a weighted edge from service i to service j of the adjacency matrix A can be constructed using a causality between service i and service j as well as a causality among error templates of service i and service j. In an embodiment, the causality between service i and service j can correspond to the service-level error causal graph constructed at block 550 of service-level causality sub-process 412. In an embodiment, the causality among error templates of service i and service j can correspond to the template-level causal graph constructed at block 570 of template-level causality sub-process 414.

Cross-entropy metric sub-process 454 can involve analyzing a cross-entropy metric of the objective function of evaluation process 450 using token vectors generated by token component 160. The cross-entropy metric can evaluate intergroup cross-entropy and intragroup cross-entropy of the plurality of groupings comprising the community structure. In an embodiment, analyzing the cross-entropy metric can facilitate minimizing cross-entropy within a given grouping of the community structure while maximizing cross-entropy across groupings comprising the community structure. In an embodiment, analyzing the cross-entropy metric can facilitate capturing services within a given grouping of the community structure that exhibit substantially similar behavior with respect to tokens present in such services while any pair of groupings comprising the community structure should exhibit substantially different behavior with respect to such tokens.

In an embodiment and given a community structure $C=\{C_1, C_2, \ldots, \text{and } C_n\}$, the cross-entropy metric of cross-entropy metric sub-process 454 can be implemented using the cross-entropy metric defined by Equation 4:

$$\text{cross − entropy metric} = \frac{\text{intergroup\_average cross − entropy}}{\text{intragroup\_average cross − entropy}}. \quad \text{Equation 4}$$

In accordance with Equation 4 above, intergroup_average_cross-entropy can be evaluated by computing, for each pair of groupings comprising the community structure, cross-entropy for each service pair that includes one service from a first grouping of a given pair of groupings and one service from a second grouping of the given pair of groupings. Intergroup_average_cross-entropy can be further evaluated by dividing the cross-entropy computed for each pair of groupings comprising the community structure by a total number of pairs of groupings comprising the community structure. In accordance with Equation 3 above, intragroup_average_cross-entropy can be evaluated by computing a summation of intragroup_cross-entropy($C_i$) over each grouping $C_i$ comprising the community structure. Intragroup_average_cross-entropy can be further evaluated by dividing the summation computed over each grouping $C_i$ comprising the community structure by $|C|$. Intragroup_cross-entropy($C_i$) can be evaluated by computing an average of pairwise cross-entropy among services in a given grouping of the community structure.

Textual similarity metric sub-process 456 can involve analyzing a textual similarity metric of the objective function of evaluation process 450 using log data 352. The textual similarity metric can evaluate intergroup log line similarity and intragroup log line similarity. In an embodiment, analyzing the textual similarity metric can facilitate capturing services within a given grouping of the community structure that exhibit substantially similar behavior with respect to log lines generated by such services while any pair of groupings comprising the community structure should exhibit substantially different behavior with respect to such log lines. In an embodiment and given a community structure $C=\{C_1, C_2, \ldots, \text{and } C_n\}$, the textual similarity metric of textual similarity metric sub-process 456 can be implemented using the textual similarity metric defined by Equation 5:

$$\text{textual similarity metric} = \frac{\text{intragroup\_averagesimilarity}}{\text{intergroup\_averagesimilarity}} \quad \text{Equation 5}$$

In accordance with Equation 5 above, intergroup_average_similarity can be evaluated by computing, for each pair of groupings comprising the community structure, textual log line similarity for each service pair that includes one service from a first grouping of a given pair of groupings and one service from a second grouping of the given pair of groupings. Inter group_average_similarlity can be further evaluated by dividing the textual log line similarity computed for each pair of groupings comprising the community structure by a total number of pairs of groupings comprising the community structure. In accordance with Equation 4 above, intragroup_average_similarity can be evaluated by computing a summation of intragroup_similarity($C_i$) over each grouping $C_i$ comprising the community structure. Intragroup_average_cross-entropy can be further evaluated by dividing the summation computed over each grouping $C_i$ comprising the community structure by $|C|$. Intragroup_similarity($C_i$) can be evaluated by computing an average of pairwise textual log line similarity among services in a given grouping of the community structure.

Figure 6:
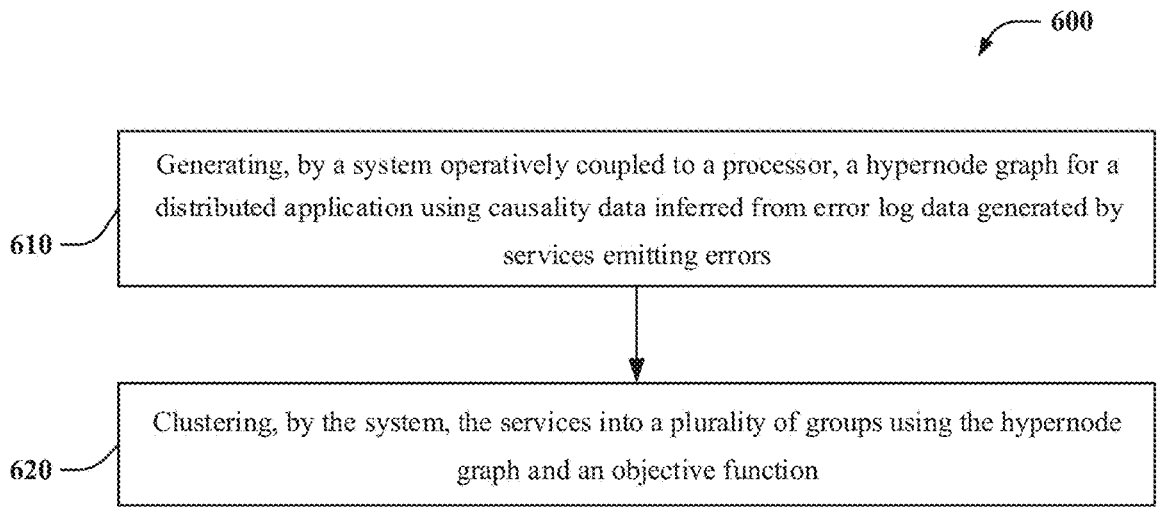
FIG. 6 illustrates a flow diagram of an example, non-limiting computer-implemented method that can facilitate fault localization for distributed applications, in accordance with one or more embodiments described herein.

FIG. 6 illustrates a flow diagram of an example, non-limiting computer-implemented method 600 of facilitating fault localization for distributed applications, in accordance with one or more embodiments described herein. Repetitive description of like elements employed in other embodiments described herein is omitted for sake of brevity. At 610, the computer-implemented method 600 can comprise generating, by a system operatively coupled to a processor (e.g., using graph compiler 140), a hypernode graph for a distributed application using causality data inferred from log data generated by services emitting errors. The distributed application can comprise the services. In an embodiment, the hypernode graph can include a hypernode that corresponds to a particular service of the distributed application, a node inside the hypernode that corresponds to a given error template observed for the particular service, an edge coupling a respective pair of nodes that are causally related, a hyperedge coupling a respective pair of hypernodes that are causally related, or a combination thereof. In an embodiment, the system can generate the hypernode graph using a template-level causal graph constructed using template-level timeseries data obtained from the log data and a service-level causal graph constructed using service-level timeseries data obtained from the log data.

At 620, the computer-implemented method 600 can comprise clustering, by the system (e.g., using partitioning component 150), the services into a plurality of groups using the hypernode graph, the token vectors, and an objective function. In an embodiment, the objective function can include a modularity metric that evaluates intergroup cohesion and intragroup cohesion within the plurality of groups. In an embodiment, the system can cluster the services into the plurality of groups by maximizing the modularity metric using the hypernode graph.

In an embodiment, the computer-implemented method 600 can further comprise generating, by the system (e.g., using token component 160), token vectors for the services using tokens flowing across the services that are observed in the log data. In an embodiment, the objective function can include an entropy-based metric that evaluates intergroup cross entropy and intragroup cross entropy of the plurality of groups. In an embodiment, the system can cluster the services into the plurality of groups by evaluating the entropy-based metric using the token vectors.

Figure 7:
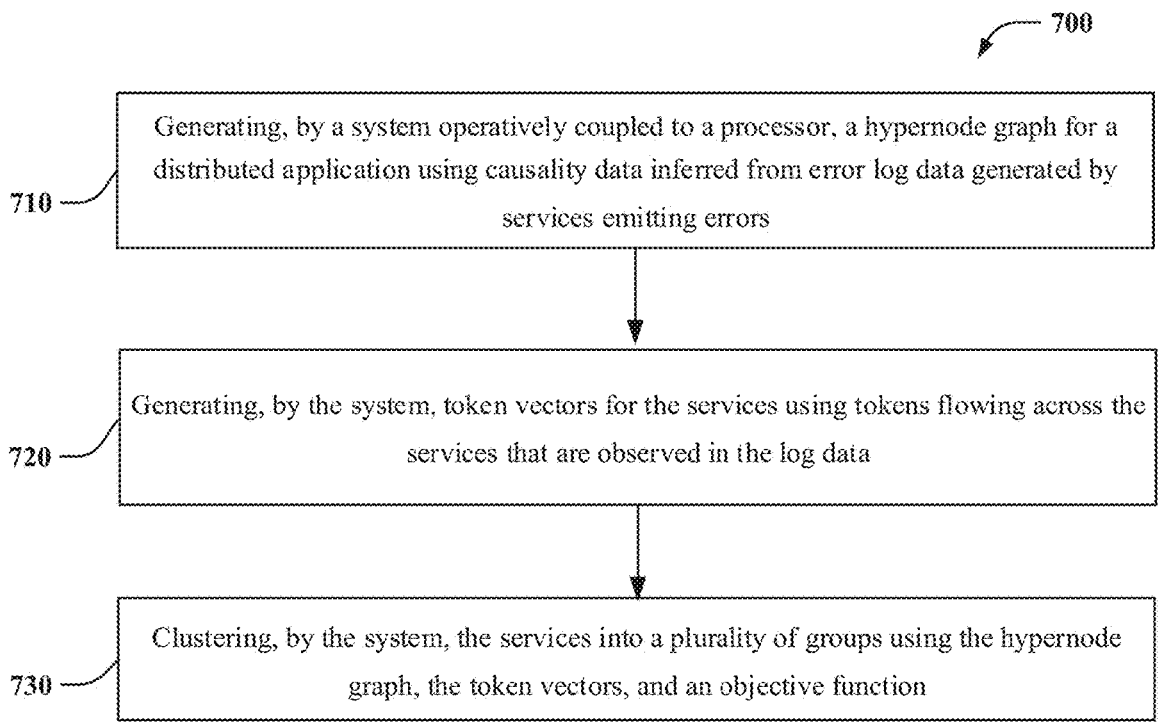
FIG. 7 illustrates a flow diagram of another example, non-limiting computer-implemented method that can facilitate fault localization for distributed applications, in accordance with one or more embodiments described herein.

FIG. 7 illustrates a flow diagram of an example, non-limiting computer-implemented method 700 of facilitating fault localization for distributed applications, in accordance with one or more embodiments described herein. Repetitive description of like elements employed in other embodiments described herein is omitted for sake of brevity. At 710, the computer-implemented method 700 can comprise generating, by a system operatively coupled to a processor (e.g., using graph compiler 140), a hypernode graph for a distributed application using causality data inferred from log data generated by services emitting errors. The distributed application can comprise the services. In an embodiment, the system can generate the hypernode graph using a template-level causal graph constructed using template-level timeseries data obtained from the log data and a service-level causal graph constructed using service-level timeseries data obtained from the log data. At 720, the computer-implemented method 700 can comprise generating, by the system (e.g., using token component 160), token vectors for the services using tokens flowing across the services that are observed in the log data. At 730, the computer-implemented method 700 can comprise clustering, by the system (e.g., using partitioning component 150), the services into a plurality of groups using the hypernode graph, the token vectors, and an objective function.

Figure 8:
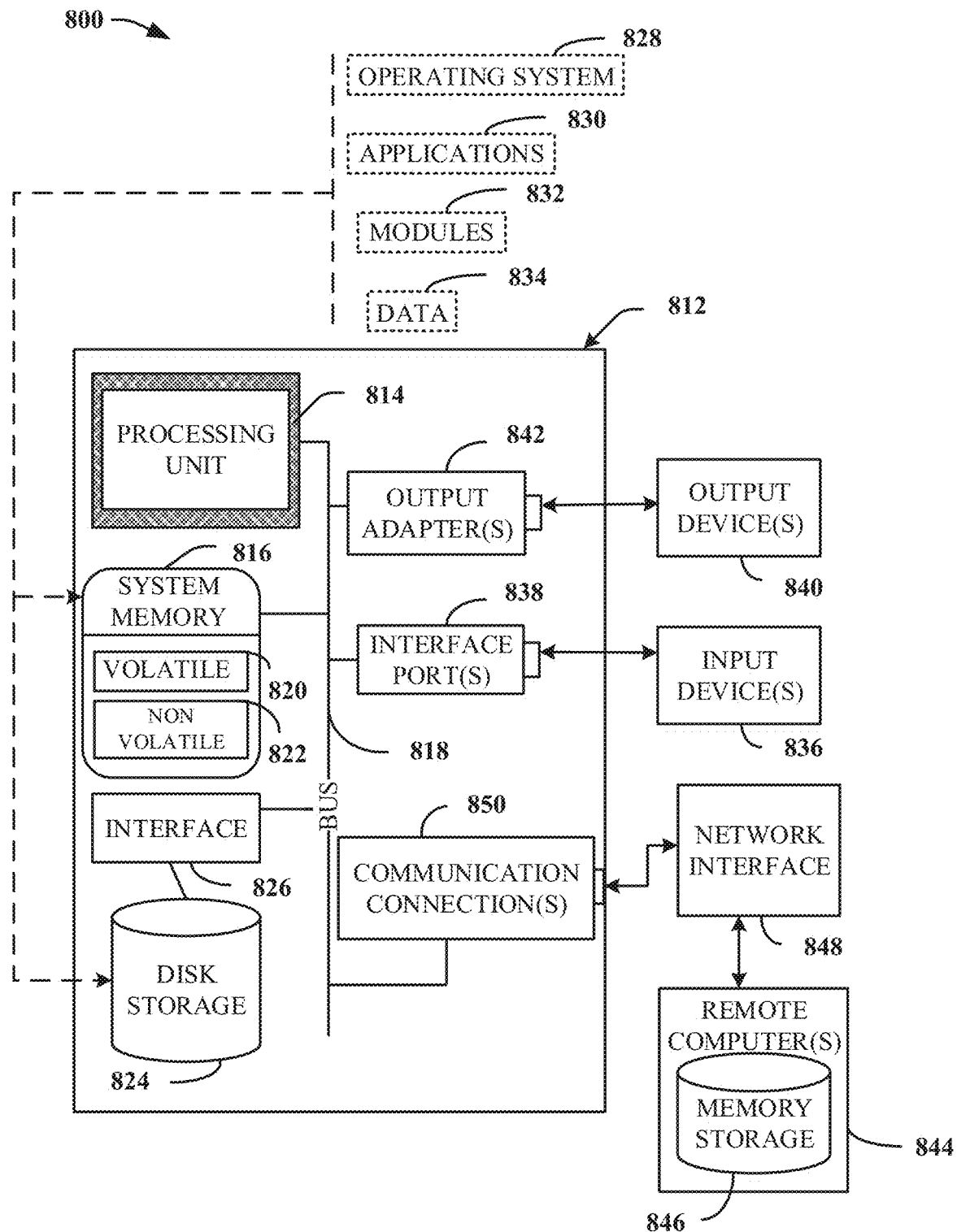
FIG. 8 is a block diagram of a non-limiting example of an operating environment in which one or more embodiments described herein can be implemented.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812. System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It can be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor-based appliance, a peer device or other common network node and the like, and typically can also include many or the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
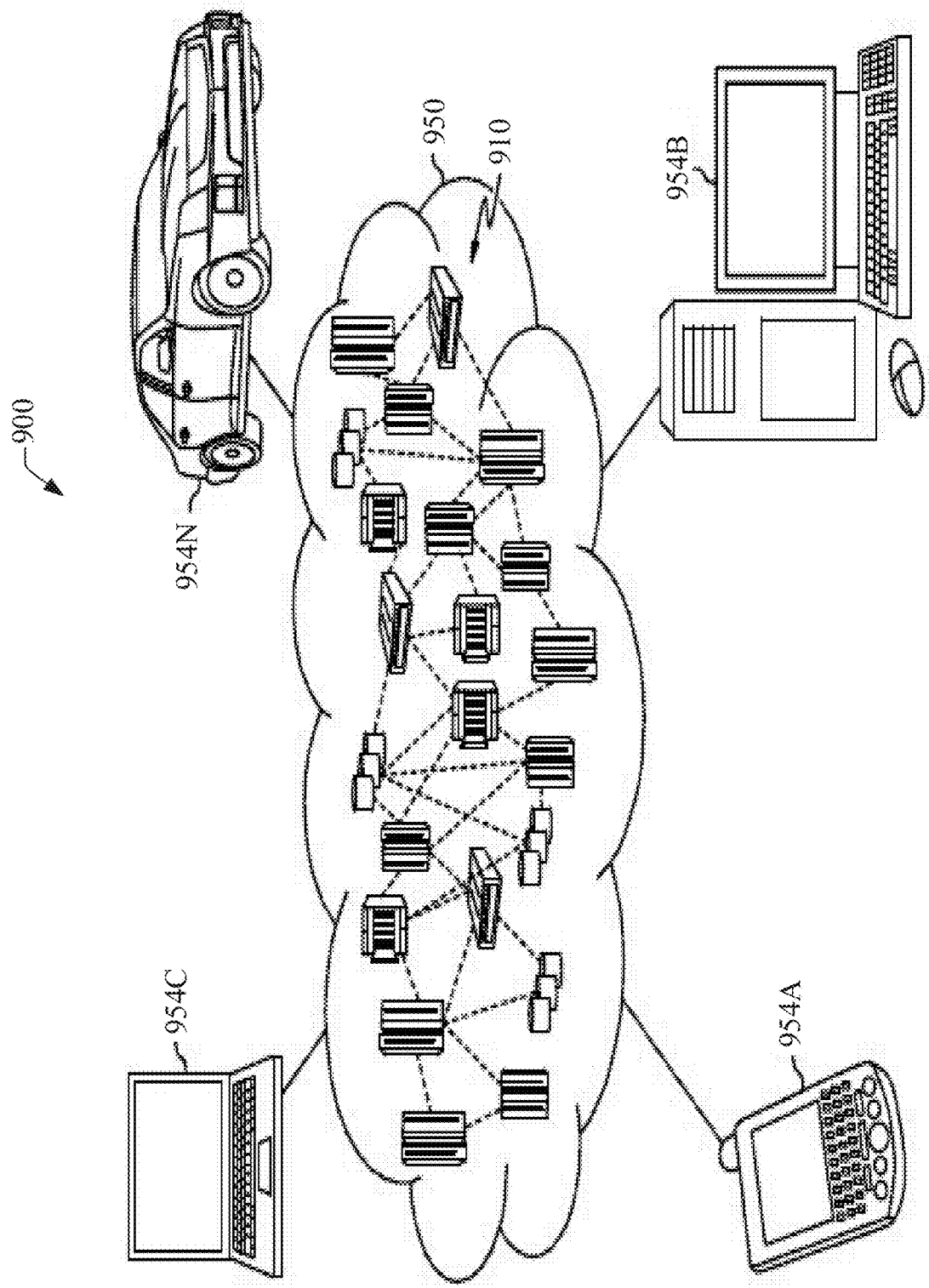
FIG. 9 is a block diagram of a non-limiting example of a cloud computing environment in accordance with one or more embodiments described herein.

In some cases, the various embodiments of system 100 described herein can be associated with a cloud computing environment. For example, the system 100 can be associated with cloud computing environment 950 as is illustrated in FIG. 9 and/or one or more functional abstraction layers described herein with reference to FIG. 10 (e.g., hardware and software layer 1060, virtualization layer 1070, management layer 1080, and/or workloads layer 1090).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Non-public cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (non-public, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9 an illustrative cloud computing environment 950 is depicted. As shown, cloud computing environment 950 includes one or more cloud computing nodes 910 with which local computing devices used by cloud consumers, such as, for example, a digital assistant (e.g., a PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, and/or another quantum platform) with which local computing devices used by cloud consumers can communicate. Nodes 910 may communicate with one another. They may be grouped (not shown) physically or virtually, in one or more networks, such as Non-Public, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
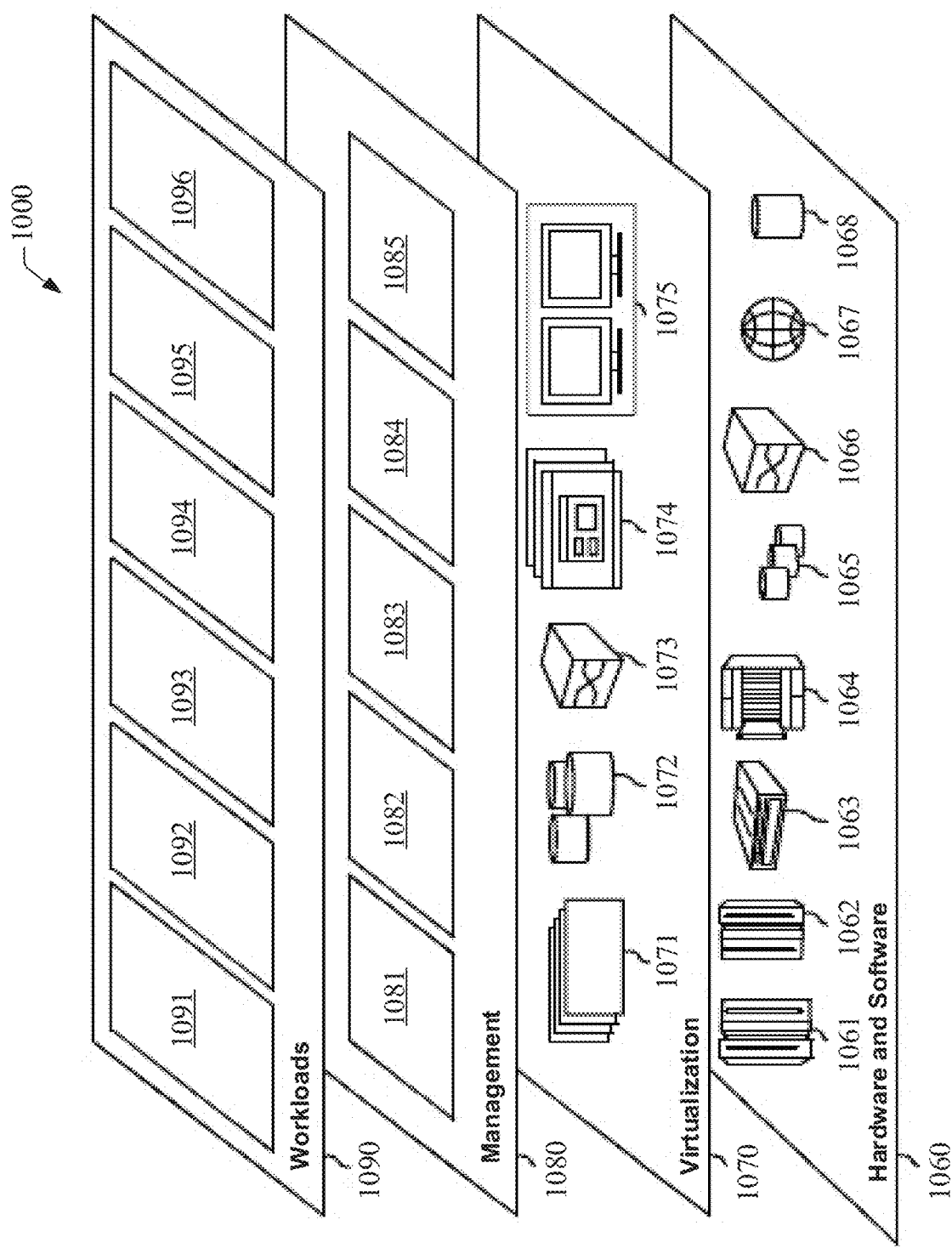
FIG. 10 is a block diagram of a non-limiting example of abstraction model layers in accordance with one or more embodiments described herein.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 include hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, database software 1068, quantum platform routing software (not illustrated in FIG. 10), and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual non-public networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and vulnerability risk assessment software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a processor that executes the following computer-executable components stored in memory:
a graph compiler that generates a hypernode graph for a distributed application using causality data inferred from log data generated by services emitting errors, wherein the distributed application comprises the services and the hypernode graph includes a hypernode that corresponds to a particular service of the distributed application;
a partitioning component that clusters the services into a plurality of groups using the hypernode graph and an objective function.

2. The system of claim 1, wherein the hypernode graph includes a node inside the hypernode that corresponds to a given error template observed for the particular service, an edge coupling a respective pair of nodes that are causally related, a hyperedge coupling a respective pair of hypernodes that are causally related, or a combination thereof.

3. The system of claim 1, wherein the graph compiler generates the hypernode graph using a template-level causal graph constructed using template-level timeseries data obtained from the log data.

4. The system of claim 1, wherein the graph compiler generates the hypernode graph using a service-level causal graph constructed using service-level timeseries data obtained from the log data.

5. The system of claim 1, wherein the objective function includes a modularity metric that evaluates intergroup cohesion and intragroup cohesion of the plurality of groups.

6. The system of claim 5, wherein the partitioning component clusters the services into the plurality of groups by maximizing the modularity metric using the hypernode graph.

7. The system of claim 1, wherein the objective function includes a textual similarity metric that evaluates intergroup log line similarity and intragroup log line similarity.

8. The system of claim 1, wherein the objective function includes a cross-entropy metric that evaluates intergroup entropy relative to intragroup entropy.

9. The system of claim 1, further comprising:
a token component that generates token vectors for the services using tokens flowing across the services that are observed in the log data.

10. The system of claim 9, wherein the objective function includes a cross-entropy metric that evaluates intergroup cross-entropy relative to intragroup cross-entropy of the plurality of groups, and wherein the partitioning component clusters the services into the plurality of groups by evaluating the cross-entropy metric using the token vectors.

11. A computer-implemented method, comprising:
generating, by a system operatively coupled to a processor, a hypernode graph for a distributed application using causality data inferred from log data generated by services emitting errors, wherein the distributed application comprises the services and the hypernode graph includes a hypernode that corresponds to a particular service of the distributed application; and
clustering, by the system, the services into a plurality of groups using the hypernode graph and an objective function.

12. The computer-implemented method of claim 11, a node inside the hypernode that corresponds to a given error template observed for the particular service, an edge coupling a respective pair of nodes that are causally related, a hyperedge coupling a respective pair of hypernodes that are causally related, or a combination thereof.

13. The computer-implemented method of claim 11, wherein the system generates the hypernode graph using a template-level causal graph constructed using template-level timeseries data obtained from the log data and a service-level causal graph constructed using service-level timeseries data obtained from the log data.

14. The computer-implemented method of claim 11, wherein the objective function includes a modularity metric that evaluates intergroup cohesion and intragroup cohesion within the plurality of groups, and wherein the system clusters the services into the plurality of groups by maximizing the modularity metric using the hypernode graph.

15. The computer-implemented method of claim 11, further comprising:
generating, by the system, token vectors for the services using tokens flowing across the services that are observed in the log data.

16. The computer-implemented method of claim 15, wherein the objective function includes an entropy-based metric that evaluates intergroup cross entropy and intragroup cross entropy of the plurality of groups, and wherein the system clusters the services into the plurality of groups by evaluating the entropy-based metric using the token vectors.

17. A computer program product comprising a computer readable storage medium having program instructions embodied therewith, the program instructions executable by a processor to cause the processor to:
generate, by the processor, a hypernode graph for a distributed application using causality data inferred from log data generated by services emitting errors, wherein the distributed application comprises the services and the hypernode graph includes a hypernode that corresponds to a particular service of the distributed application; and
cluster, by the processor, the services into a plurality of groups using the hypernode graph and an objective function.

18. The computer program product of claim 17, the processor generates the hypernode graph using a template-level causal graph constructed using template-level timeseries data obtained from the log data and a service-level causal graph constructed using service-level timeseries data obtained from the log data.

19. The computer program product of claim 17, wherein the objective function includes a modularity metric that evaluates intergroup cohesion and intragroup cohesion within the plurality of groups, and wherein the processor clusters the services into the plurality of groups by maximizing the modularity metric using the hypernode graph.

20. The computer program product of claim 17, the program instructions executable by the processor to further cause the processor to:
generate, by the processor, token vectors for the services using tokens flowing across the services that are observed in the log data, wherein the objective function includes an entropy-based metric that evaluates intergroup cross entropy and intragroup cross entropy of the plurality of groups, and wherein the processor clusters the services into the plurality of groups by evaluating the entropy-based metric using the token vectors.

21. The computer program product of claim 17, wherein the objective function includes a text-based metric that evaluates the log data for intergroup textual similarity and intragroup textual similarity within the plurality of groups.

22. A system, comprising:
a processor that executes the following computer-executable components stored in memory:
a graph compiler that generates a hypernode graph for a distributed application using causality data inferred from log data generated by services emitting errors, wherein the distributed application comprises the services;
a token component that generates token vectors for the services using tokens flowing across the services that are observed in the log data; and
a partitioning component that clusters the services into a plurality of groups using the hypernode graph, the token vectors, and an objective function.

23. The system of claim 22, wherein the graph compiler generates the hypernode graph using a template-level causal graph constructed using template-level timeseries data obtained from the log data and a service-level causal graph constructed using service-level timeseries data obtained from the log data.

24. A computer-implemented method, comprising:
generating, by a system operatively coupled to a processor, a hypernode graph for a distributed application using causality data inferred from log data generated by services emitting errors, wherein the distributed application comprises the services;
generating, by the system, token vectors for the services using tokens flowing across the services that are observed in the log data; and
clustering, by the system, the services into a plurality of groups using the hypernode graph, the token vectors, and an objective function.

25. The computer-implemented method of claim 24, wherein the system generates the hypernode graph using a template-level causal graph constructed using template-level timeseries data obtained from the log data and a service-level causal graph constructed using service-level timeseries data obtained from the log data.

\* \* \* \* \*